(12) United States Patent
Bharathan (10) Patent No.: US 12,498,826 B2
(45) Date of Patent: Dec. 16, 2025

(54) CAPACITIVE SENSOR

(71) Applicant: Cypress Semiconductor Corporation, San Jose, CA (US)

(72) Inventor: Vibheesh Bharathan, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 158 days.

(21) Appl. No.: 18/375,396

(22) Filed: Sep. 29, 2023

(65) Prior Publication Data

US 2025/0110594 A1 Apr. 3, 2025

(51) Int. Cl.
*G06F 3/041* (2006.01)
*G06F 3/044* (2006.01)

(52) U.S. Cl.
CPC ...... *G06F 3/04186* (2019.05); *G06F 3/04166* (2019.05); *G06F 3/0448* (2019.05); *G06F 2203/04107* (2013.01); *G06F 2203/04108* (2013.01)

(58) Field of Classification Search
CPC ............. G06F 3/04166; G06F 3/04186; G06F 2203/04107; G06F 2203/04108; G06F 3/0448
See application file for complete search history.

(56) References Cited

U.S. PATENT DOCUMENTS

| 9,684,418 B1 * | 6/2017 | Hills | ...................... G06F 3/041 |
| 2022/0137775 A1 * | 5/2022 | Hou | ................... G06F 3/04186 345/174 |

* cited by examiner

*Primary Examiner* — Deeprose Subedi (57) ABSTRACT

One or more computing devices, systems, and/or methods are provided. In an example, a human machine interface comprises a guard sensor, a human input sensor adjacent the guard sensor, and a controller. The controller is configured to measure a first response of the guard sensor using a first sensing signal having a first frequency, measure a second response of the guard sensor using a second sensing signal having a second frequency, configure a sensor frequency of the human input sensor based on the first response of the guard sensor and the second response of the guard sensor, measure a first response of the human input sensor using the sensor frequency, and identify a touch event on the human input sensor based on the first response of the human input sensor.

20 Claims, 6 Drawing Sheets

CAPACITIVE SENSOR

BACKGROUND

Computing devices, such as notebook computers, personal data assistants (PDAs), and mobile handsets, have user interface devices, which are also known as human interface devices (HID). One type of user interface devices are touch-sensing devices, such as touch-sensor pads (also commonly referred to as touchpads), touch-sensor sliders, touch-sensor buttons, touch-sensor keyboards, touch screens, and touch panels. Capacitance-sensing devices are, at times, used to replace mechanical buttons, knobs, and other similar mechanical user interface controls. Capacitance-sensing devices have relatively few complicated mechanical switches and buttons, and can generally provide reliable operation under harsh conditions. In addition, capacitance-sensing devices are widely used in modern customer applications, providing new user interface options in existing products.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a method comprises measuring a first response of a guard sensor of a human machine interface using a first sensing signal having a first frequency, measuring a second response of the guard sensor using a second sensing signal having a second frequency, configuring a human input sensor of the human machine interface adjacent the guard sensor to select a sensor frequency based on the first response of the guard sensor and the second response of the guard sensor, measuring a first response of the human input sensor using the sensor frequency, and identifying a touch event on the human input sensor based on the first response of the human input sensor.

In an embodiment of the techniques presented herein, a system comprises means for measuring a first response of a guard sensor of a human machine interface using a first sensing signal having a first frequency, means for measuring a second response of the guard sensor using a second sensing signal having a second frequency, means for configuring a human input sensor of the human machine interface adjacent the guard sensor to select a sensor frequency based on the first response of the guard sensor and the second response of the guard sensor, means for measuring a first response of the human input sensor using the sensor frequency, and means for identifying a touch event on the human input sensor based on the first response of the human input sensor.

In an embodiment of the techniques presented herein, a human machine interface comprises a guard sensor, a human input sensor adjacent the guard sensor, and a controller configured to measure a first response of the guard sensor using a first sensing signal having a first frequency, measure a second response of the guard sensor using a second sensing signal having a second frequency, configure a sensor frequency of the human input sensor based on the first response of the guard sensor and the second response of the guard sensor, measure a first response of the human input sensor using the sensor frequency, and identify a touch event on the human input sensor based on the first response of the human input sensor.

In an embodiment of the techniques presented herein, a human machine interface comprises a guard sensor, a human input sensor adjacent the guard sensor, and a controller configured to detect an interference event on the guard sensor using a frequency hopping technique with a set of sensing frequencies, detect a touch event on the human input sensor using a single frequency technique, and configure a sensor frequency of the human input sensor for the single frequency technique based on the interference event.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

In some embodiments, a human machine interface includes a guard sensor for detecting interference sources that can generate false positive touch events. Interference can come from liquid present on a sensing surface of the human machine interface. Interference may also be present in the form of radio frequency (RF) interference from a nearby transmitter. RF interference can interfere with sensing signal used by the human machine interface if the frequencies are close. In some embodiments, the human machine interface uses a frequency-hopping technique for sensing signals used with the guard sensor to identify interference sources and a single frequency technique for the sensing signal used with human input sensors on the human machine interface. This approach saves power and reduces latency compared to using frequency-hopping for the human input sensors. In the case of a liquid impingement event, the human machine interface can disable the human input sensors. In the case of an RF interference source, human machine interface, the set of frequencies used for the guard sensor can be modified. The single frequency used for the human input sensors can be selected as the frequency with the lowest noise.

Figure 1:
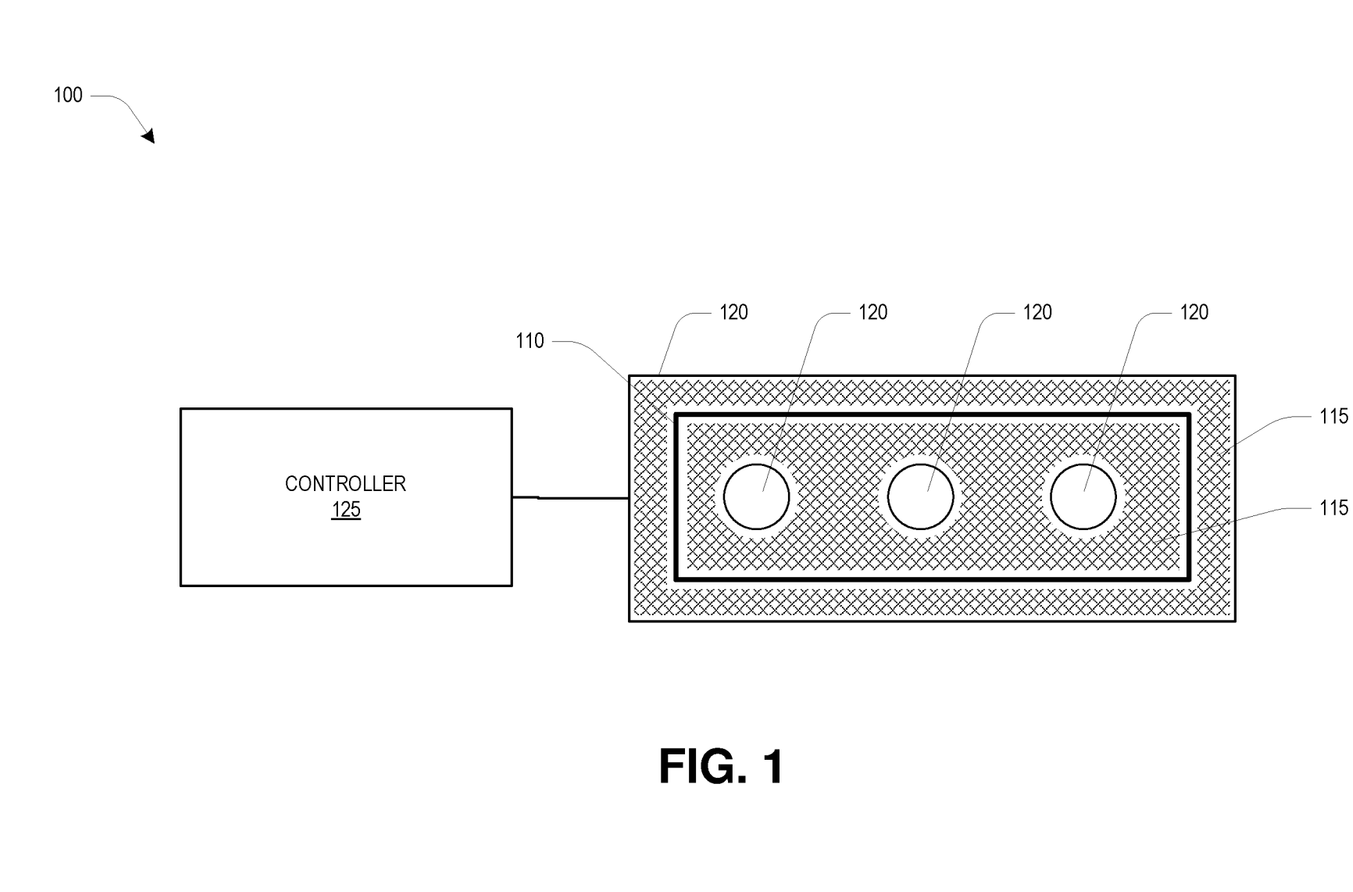
FIG. 1 is a diagram illustrating an example human machine interface, in accordance with some embodiments.

FIG. 1 is a diagram illustrating an example human machine interface 100, in accordance with some embodiments. In some embodiments, the human machine interface 100 comprises human input sensors 105, a guard sensor 110, and shield electrodes 115, positioned on a sensing surface 120. A controller 125 interfaces with the human input sensors 105, the guard sensor 110, and the shield electrode 115 for controlling the operation of the human machine interface 100. The human input sensors 105 may be touch-sensing devices, such as touchpads, touch-sensor sliders, touch-sensor buttons, touch-sensor keyboards, touch screens, touch panels, or some other touch sensor type of capacitive sensor for sensing a human input. The configuration of the sensing surface 120, the number, shape, and arrangement of the human input sensors 105, the number, shape, and arrangement of the guard sensors 110, and the number, shape, and arrangement of the shield electrodes 115 may vary. Other structures and/or configurations of the human machine interface 100 are within the scope of the present disclosure.

The controller 125 detects touches on the human input sensors 105 indicating user inputs. A user's touch affects the capacitance of the human input sensor 105. The controller 125 detects this change in capacitance to read user input from the human machine interface 100. The controller 1125 may employ various methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement techniques.

The guard sensor 110 detects interference sources, such as a fluid on the sensing surface 120 or radio frequency (RF) interference sources near the human machine interface 100 that may mimic human touches. The shield electrodes 115 are used to distinguish between human touches and capacitive changes resulting from fluid, such as a fluid droplet present on the sensing surface 120. For example, sensing may be performed with different activation states of the shield electrodes 115 to distinguish between touch events and liquid impingement events. Inputs from interference sources can result in false positive detections on the guard sensor 110 or the human input sensors 105.

To facilitate liquid detection, the guard sensor 110 is typically tuned to be more sensitive than the human input sensors 105. This increased sensitivity increases the sensitivity of the guard sensor 110 to noise, such as RF sources near the human machine interface, which may also trigger false positive touch events. The human input sensors 105 are also susceptible to noise from RF interference sources, albeit to a lesser degree than the guard sensor 110.

One technique to reduce noise sensitivity to RF interference sources on the human input sensors 105 is frequency-hopping where sensing is performed using multiple signals at different, non-harmonic frequencies and using a voting technique to exclude false positive signals generated by RF interference sources. For example, if three sensing frequencies are used and an RF interference source is present at a frequency near one of the sensing frequencies, a false positive seen at the interference frequency is not seen in the responses received using signals at the other two frequencies. The non-affected frequencies will outvote the frequency with interference, thereby excluding the false positive event. A frequency-hopping technique may also be implemented for the guard sensor 110. Drawbacks of a frequency-hopping technique include increased power consumption and slower response times due to the necessity of measuring the responses at the plurality of sensor frequencies.

In some embodiments, the controller 125 reduces power consumption and latency by using a frequency-hopping technique for the guard sensor 110 to identify RF interference sources and configuring a sensor frequency for the human input sensors 105 to avoid sensing using a sensor frequency near an interference source. In this manner, the controller 125 may sense touch events at the human input sensors 105 using only a single sensor frequency, thereby reducing power consumption and latency. In some embodiments, the controller 125 may change the frequencies in the set used for frequency-hopping in the guard sensor 110 to exclude the frequencies of detected RF interference sources.

Figure 2:
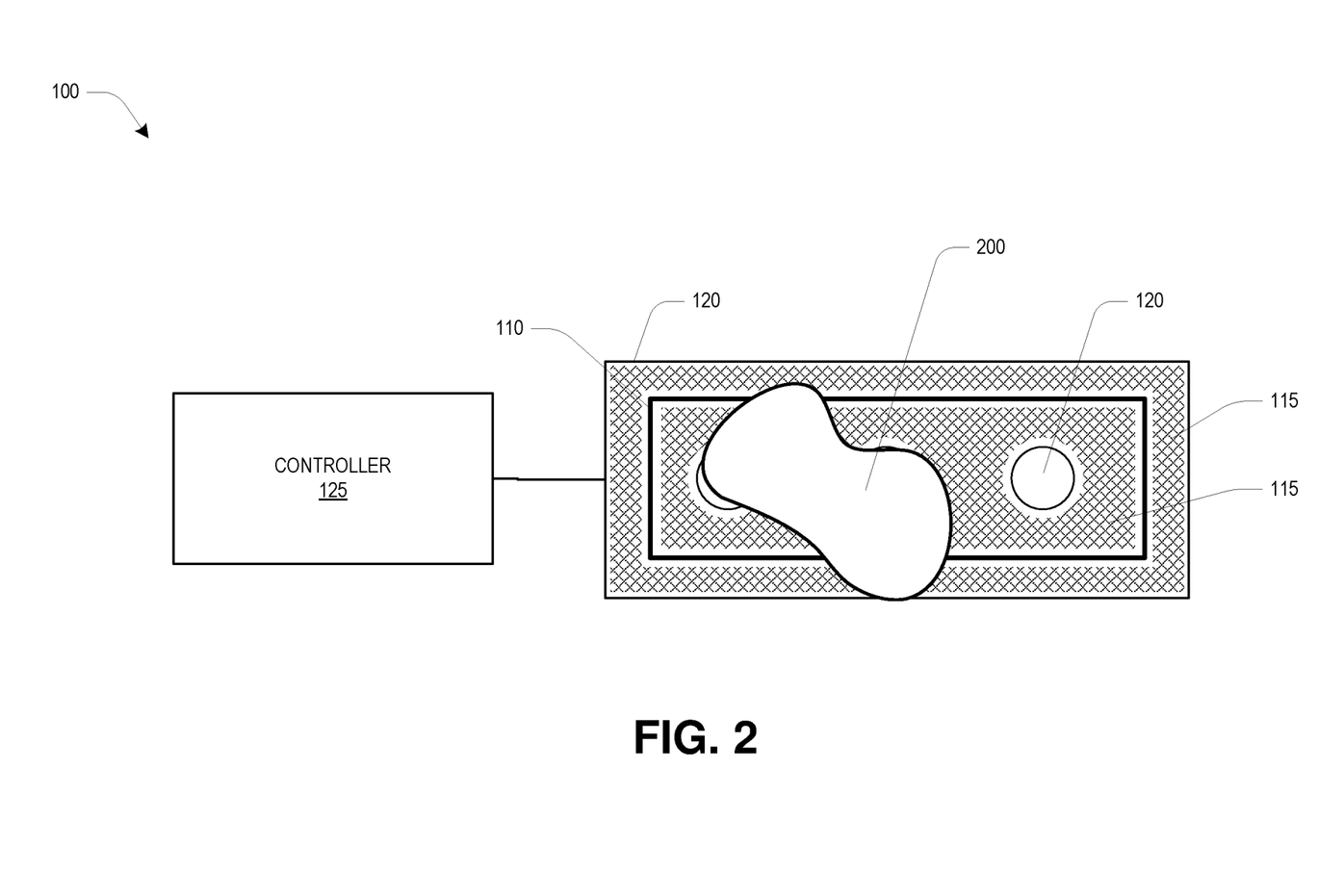
FIG. 2 is a diagram illustrating an example human machine interface in the presence of a liquid, in accordance with some embodiments.

FIG. 2 is a diagram illustrating an example human machine interface 100 in the presence of a liquid deposit 200 on the sensing surface 120, in accordance with some embodiments. The liquid deposit 200 impinges on the guard sensor 110 and one or more of the human input sensors 105. In some embodiments, the controller 125 detects the liquid deposit 200 based on the responses measured at the guard sensor 110. The controller 125 senses the responses of the guard sensor 110 using a frequency-hopping technique with a set of sensing signals with different frequencies. The number of the sensing signals in the guard sensing set and the frequencies of the sensing signals may vary and may be changed dynamically, such as by the user or by the controller 125. The controller 125 senses the response of the guard sensor 110 at each of the frequencies of the sensing signals in the guard sensing set and uses a majority voting technique. If the activation of the guard sensor 110 is caused by the liquid deposit 200 the response of the guard sensor 110 should be consistent across the set of sensing signals.

In some embodiments, the controller 125 distinguishes between a touch event and a liquid impingement event based on the magnitude of the responses from the guard sensor 110. Typically, the response from a liquid impingement event causes a greater change in capacitance than a touch event because the liquid deposit 200 covers a larger surface area of the guard sensor 110 compared to a touch event. A response threshold may be applied to distinguish between a touch event and a liquid impingement event. In some embodiments, the controller 125 may also modulate the shield electrode 115 during the sensing to distinguish between a touch event and a liquid impingement event. Typically, due to the large ground associated with a human, the response of the guard sensor 110 is not affected by the presence or absence of a signal applied to the shield electrode 115. Hence, the controller 125 can compare the responses from the guard sensor 110 with the shield electrode 115 enabled to the responses from the guard sensor 110 with the shield electrode 115 disabled. If the responses do not change significantly with the enablement state of the shield electrode 115, the event is likely a touch event rather than a liquid impingement event.

Upon identifying a liquid impingement event from the liquid deposit 200, the controller 125 takes a protective action. In some embodiments, the protective action comprises disabling the human input sensors 105 proximate the guard sensor 110. In some embodiments, the human machine interface 100 comprises multiple sets of human input sensors 105 each with an adjacent guard sensor 110. Human input sensors 105 not near the guard sensor 110 that detected the liquid impingement event may not be disabled.

Figure 3:
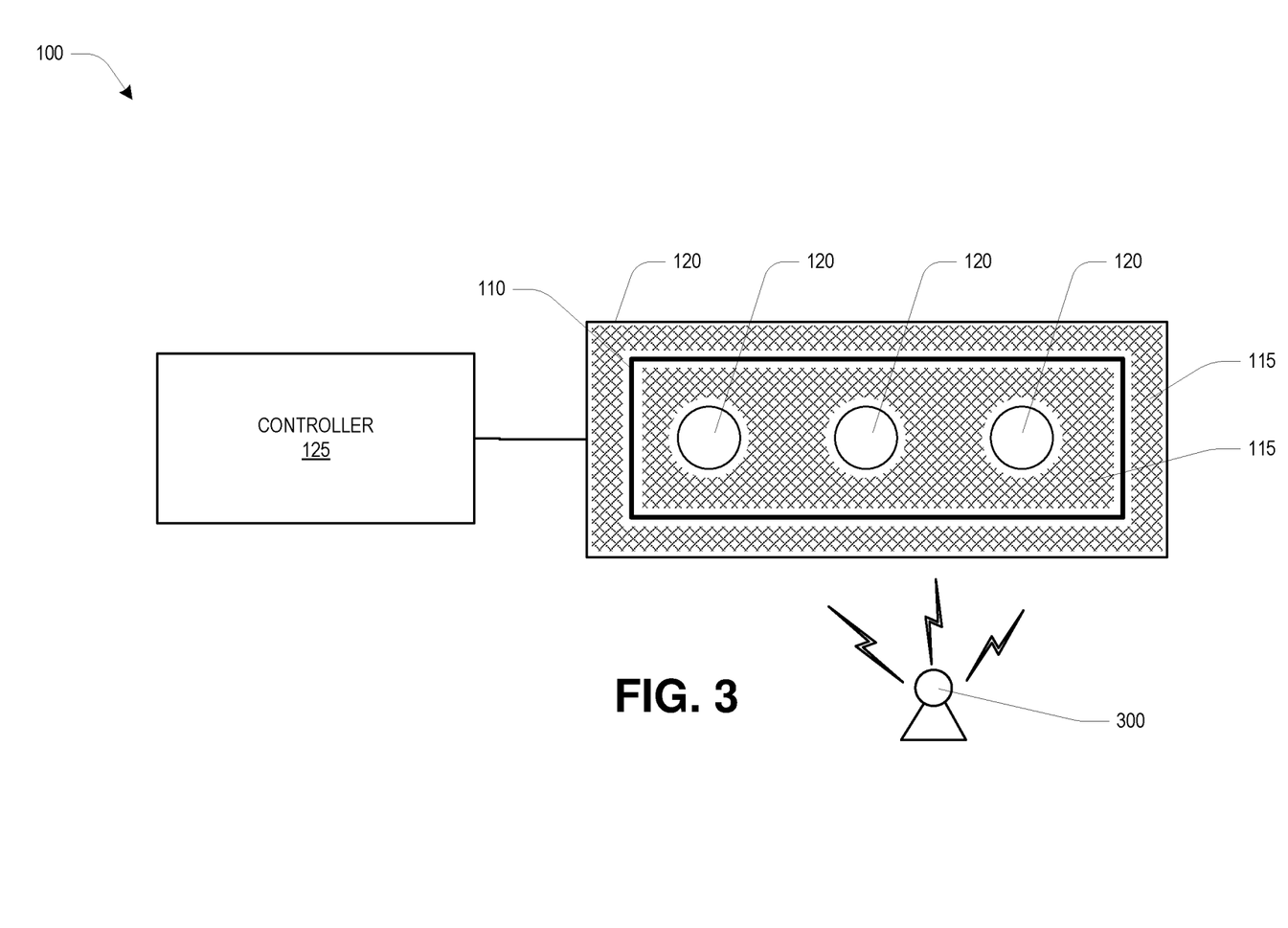
FIG. 3 is a diagram illustrating an example human machine interface in the presence of a noise source, in accordance with some embodiments.

FIG. 3 is a diagram illustrating an example human machine interface 100 in the presence of a noise source 300, in accordance with some embodiments. The noise source 300 may be an RF noise source, such as a radio, broadcasting at a frequency at or near one of the frequencies of the signals for measuring the responses of the guard sensor 110 or the human input sensors 105. In some embodiments, the controller 125 identifies the noise source 300 based on one or more minority detections across the sensing signals in the guard sensing set. For example, the noise source 300 typically would cause a false detection for the sensing signal having a frequency near that of the noise source 300. Since the frequencies for the sensing signals in the guard sensing set are selected to be non-harmonics of each other, the responses of the guard sensor 110 at the other frequencies should not be affected resulting in negative detections. In some cases, multiple noise sources may be present at different frequencies, but the number of detections would still be in the minority. In a noisy environment, the number of sensing signals used for the guard sensor 110 may be increased, such as from three to five. In response to identifying the interfering noise source 300, the controller 125 may take one or more corrective actions, such as excluding the compromised frequency from the sensing signals in the guard sensing set, changing the frequency used in the sensing signals in the guard sensing set to a different frequency, changing the number of sensing signals in the guard sensing set, or configuring the sensor signal for the human input sensors 105 to be a frequency other than the compromised frequency. In some embodiments, the controller 125 compares the responses of the guard sensor across all of the sensing signals in the guard sensing set and selects the frequency with the lowest noise response as the frequency of the sensor signal for determining the responses of the human input sensors 105. This approach reduces the likelihood of a false detection from the human input sensors 105 due to the noise source 300.

Figure 4:
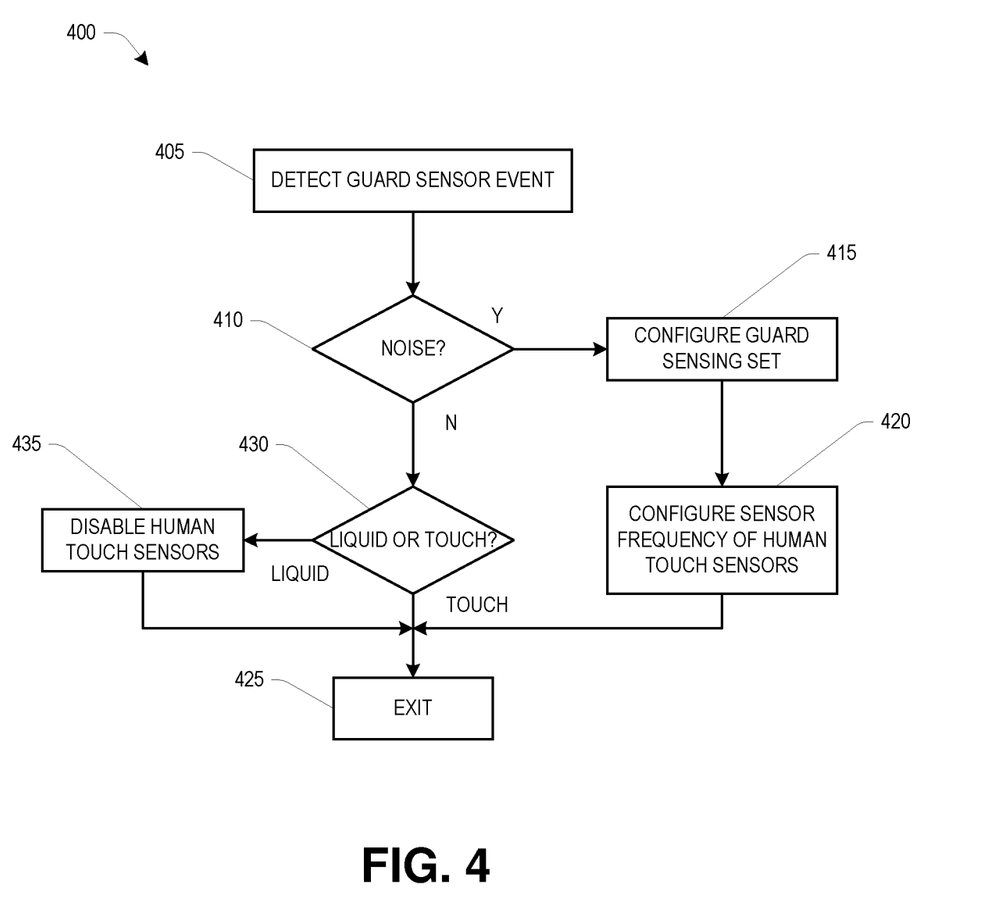
FIG. 4 is a diagram illustrating a method for operating a human machine interface, in accordance with some embodiments.

In some embodiments, the guard sensor 110 may also be employed by the controller 125 as a proximity sensor. For example, if a user comes near the human machine interface 100, without necessarily touching the sensing surface 120, the guard sensor 110 may register a decreased capacitance due to the proximity of the user. In some embodiments, the controller 125 may control a sleep state of the human machine interface 100 based on the proximity detection or lack or proximity. For example, if the human machine interface 100 is in a reduced power sleep state, the controller 125 may only monitor the guard sensor 110. Upon detecting a proximity event using the guard sensor 110, the controller 135 may exit the sleep state. Conversely, if the controller 125 fails to receive any user input from the human input sensors 105 for a predetermined time interval and also fails to register a proximity event using the guard sensor 110, the controller 125 may enter the sleep state FIG. 4 is a diagram illustrating a method 400 for operating a human machine interface 100, in accordance with some embodiments. At block 405, the controller 125 detects an event at the guard sensor 110. The controller 125 may use a frequency-hopping technique the measures the responses of the guard sensor in response to sensing signals in a guard sensing set, i.e., having different frequencies. At 410, the controller 125 determines if the guard sensor event is a noise event. For example, the noise source 300 of FIG. 3 may be identified if the event is only triggered at a minority frequency of the frequencies in the guard sensing set. If a noise event is detected at 410, the controller 125 configures the guard sensing set at 415, such as excluding the compromised frequency from the guard sensing set, or changing one or more frequencies used in the guard sensing set, changing the number of sensing signals in the guard sensing set. At 420, the controller 125 configures the sensor frequency for the human input sensors 105. For example, the sensor frequency for determining the response of the human input sensors 105 may be a frequency other than the compromised frequency or the frequency from the guard sensor set with the lowest noise response. The method 400 terminates at 425. If the guard sensor event detected at 405 is not a noise event at 410, the controller 125 determines if the guard sensor event is a liquid impingement event or a touch event at 430. In some embodiments, the controller 125 may distinguish between a touch event and a liquid impingement event based on the magnitudes of the responses of the guard sensor 110 or the sensitivity of the responses to the enablement state of the shield electrode 115. If the guard sensor event is a touch event at 430, the event is ignored and the method 400 terminates at 425. If the guard sensor event is a liquid impingement event at 430, the controller 125 disables the human input sensors 105 at 435, and the method 400 terminates at 425. The human input sensors 105 may be disabled until the guard sensor event clears at a later time.

Figure 5:
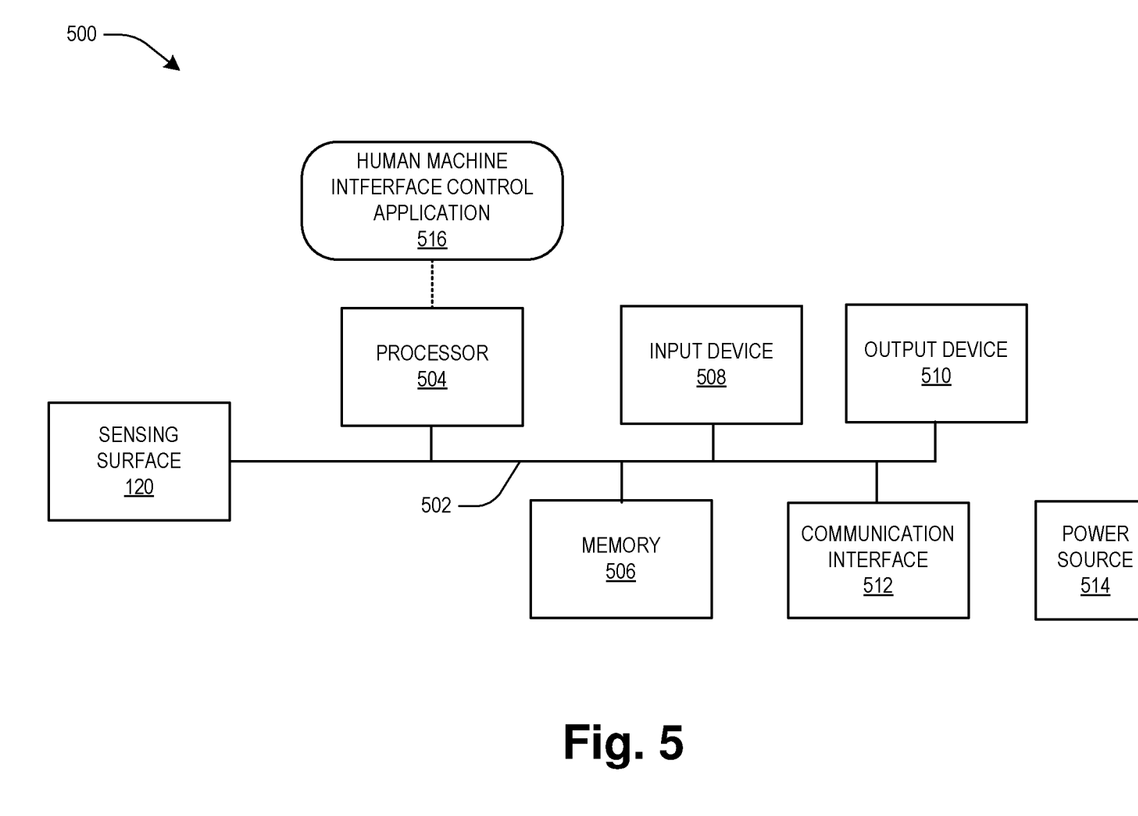
FIG. 5 is a diagram of a processing unit, in accordance with some embodiments.

FIG. 5 is a diagram of a device 500 for implementing the human machine interface 100, in accordance with some embodiments. In some embodiments, the device 500 comprises a bus 502, a processor 504, a memory 506 that stores software instructions or operations, an input device 508, an output device 510, a communication interface 512, and a power source 514, such as a battery. The processor 504 implements a software application, such as a human machine interface control application 516 that communicates with the human input sensors 105, the guard sensor 110, and the shield electrode 115 on the sensing surface 120 and implements the controller 125 of FIG. 1. The device 500 may include fewer components, additional components, different components, and/or a different arrangement of components than those illustrated in FIG. 5.

According to some embodiments, the bus 502 includes a path that permits communication among the components of the device 500. For example, the bus 502 may include a system bus, an address bus, a data bus, and/or a control bus. The bus 502 may also include bus drivers, bus arbiters, bus interfaces, clocks, and so forth. The processor 504 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processor 504 may be implemented as hardware (e.g., a microprocessor, etc.), a combination of hardware and software (e.g., a SoC, an ASIC, etc.), may include one or multiple memories (e.g., cache, etc.), etc.

In some embodiments, the processor 504 controls the overall operation or a portion of the operation(s) performed by the controller 125. The processor 504 performs one or multiple operations based on an operating system and/or various applications or computer programs (e.g., software). The processor 504 accesses instructions from the memory 506, from other components of the device 500, and/or from a source external to the device 500 (e.g., a network, another device, etc.). The processor 504 may perform an operation and/or a process based on various techniques including, for example, multithreading, parallel processing, pipelining, interleaving, etc.

In some embodiments, the memory 506 includes one or multiple memories and/or one or multiple other types of storage mediums. For example, the memory 506 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other suitable type of memory. The memory 506 may include a hard disk, a magnetic disk, an optical disk, a magneto-optic disk, a solid state disk, a Micro-Electromechanical System (MEMS)-based storage medium, a nanotechnology-based storage medium, and/or some other suitable disk. The memory 506 may include drives for reading from and writing to the storage medium. The memory 506 may be external to and/or removable from the device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). The memory 506 may store data, software, and/or instructions related to the operation of the controller 125.

The communication interface 512 permits the device 500 to communicate with other devices, networks, systems, sensors, and/or the like on a network. The communication interface 512 may include one or multiple wireless interfaces and/or wired interfaces. For example, the communication interface 512 may include one or multiple transmitters and receivers, or transceivers. The communication interface 512 may operate according to a protocol stack and a communication standard. In some embodiments, the communication interface 512 includes an antenna. The communication interface 512 may include various processing logic or circuitry (e.g., multiplexing/de-multiplexing, filtering, amplifying, converting, error correction, etc.). In some embodiments, the communication interface 512 operates using a long range wireless protocol, such as a cellular protocol or a WiFi protocol, a short range protocol, such as BLUETOOTH™, or a wired protocol, such as Ethernet.

In some embodiments, the input device 508 permits an input into the device 500. For example, the input device 508 may comprise a keyboard, a mouse, a display, a touchscreen, a touchless screen, a button, a switch, an input port, speech recognition logic, and/or some other type of suitable visual, auditory, or tactile input component. The output device 510 permits an output from the device 500. For example, the output device 510 may include a speaker, a display, a touchscreen, a touchless screen, a projected display, a light, an output port, and/or some other type of suitable visual, auditory, or tactile output component. In some embodiments, the output device 518 may be remote and may communicate with the processor 504 using the communication interface 512.

Figure 6:
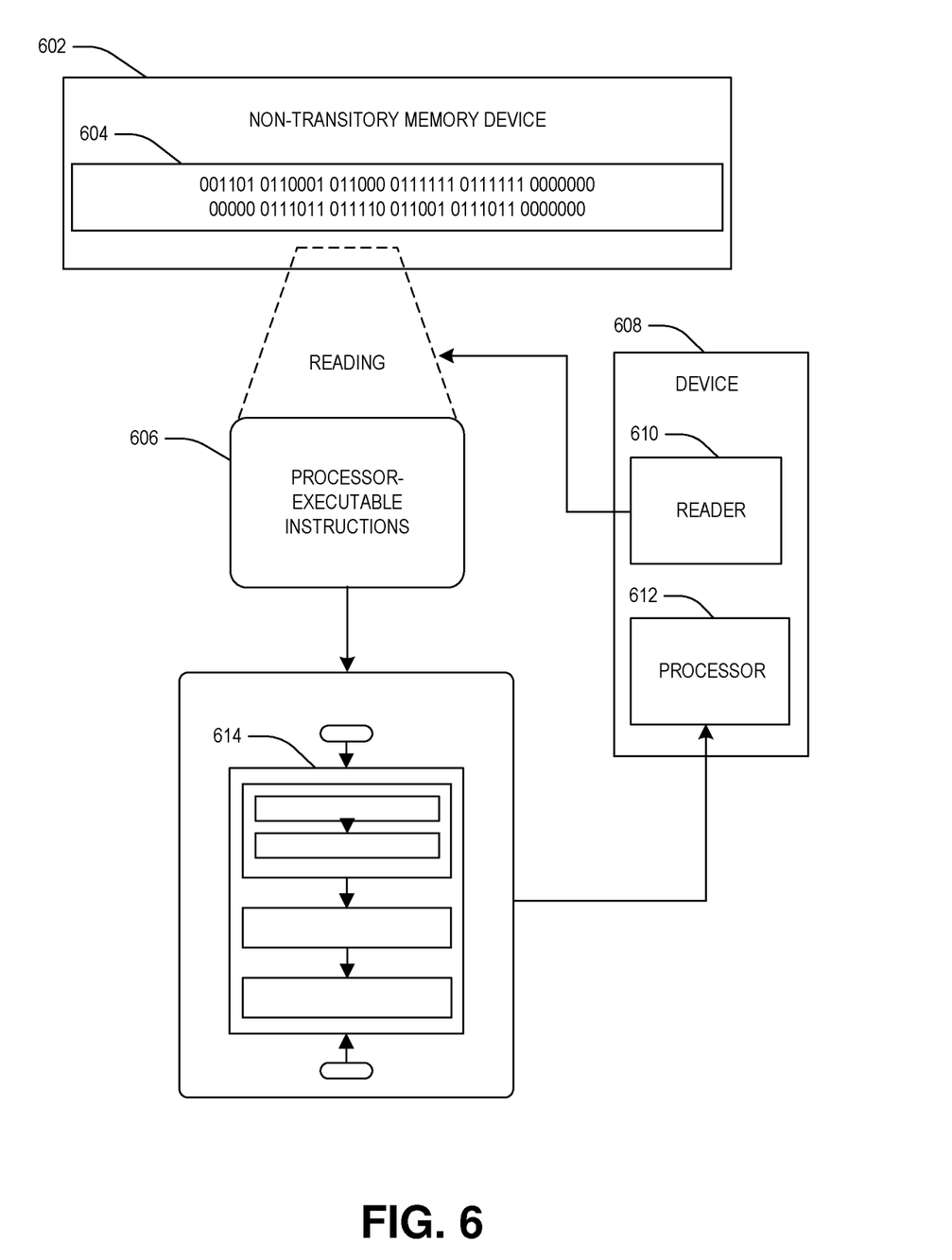
FIG. 6 illustrates an exemplary embodiment of a computer-readable medium, in accordance with some embodiments.

FIG. 6 illustrates an exemplary embodiment 600 of a computer-readable medium 602, in accordance with some embodiments. One or more embodiments involve a computer-readable medium comprising processor-executable instructions configured to implement one or more of the techniques presented herein. The embodiment 600 comprises a non-transitory computer-readable medium 602 (e.g., a CD-R, DVD-R, flash drive, a platter of a hard disk drive, etc.), on which is encoded computer-readable data 604. This computer-readable data 604 in turn comprises a set of processor-executable computer instructions 606 that, when executed by a computing device 608 including a reader 610 for reading the processor-executable computer instructions 606 and a processor 612 for executing the processor-executable computer instructions 606, are configured to facilitate operations according to one or more of the principles set forth herein. In some embodiments, the processor-executable computer instructions 606, when executed, are configured to facilitate performance of a method 614, such as at least some of the aforementioned method(s). In some embodiments, the processor-executable computer instructions 606, when executed, are configured to facilitate implementation of a system, such as at least some of the one or more aforementioned system(s). Many such computer-readable media may be devised by those of ordinary skill in the art that are configured to operate in accordance with the techniques presented herein.

In an embodiment of the techniques presented herein, a method comprises measuring a first response of a guard sensor of a human machine interface using a first sensing signal having a first frequency, measuring a second response of the guard sensor using a second sensing signal having a second frequency, configuring a human input sensor of the human machine interface adjacent the guard sensor to select a sensor frequency based on the first response of the guard sensor and the second response of the guard sensor, measuring a first response of the human input sensor using the sensor frequency, and identifying a touch event on the human input sensor based on the first response of the human input sensor.

In an embodiment of the techniques presented herein, the method comprises determining a presence of an interference source based on the first response of the guard sensor and the second response of the guard sensor, wherein configuring the human input sensor comprises configuring the human input sensor responsive to determining the presence of the interference source.

In an embodiment of the techniques presented herein, the interference source comprises a liquid impinging on the human machine interface, and configuring the human input sensor comprises disabling the human input sensor.

In an embodiment of the techniques presented herein, measuring the first response of the guard sensor and the second response of the guard sensor comprises measuring the first response of the guard sensor and the second response of the guard sensor with a shield electrode of the human machine interface enabled, and the method comprises measuring a third response of the guard sensor using the first sensing signal with the shield electrode disabled, and measuring a fourth response of the guard sensor using the second sensing signal with the shield electrode disabled, and determining the presence of the interference source comprises differentiating between a touch event and a liquid impingement event on the guard sensor based on the third response of the guard sensor and the fourth response of the guard sensor.

In an embodiment of the techniques presented herein, the interference source comprises a radio frequency interference source at the first frequency, and configuring the human input sensor comprises selecting the second frequency as the sensor frequency.

In an embodiment of the techniques presented herein, the method comprises changing the first sensing signal to have a third frequency different than the first frequency, and measuring the first response of the guard sensor using the first sensing signal with the third frequency.

In an embodiment of the techniques presented herein, the method comprises detecting a proximity event based on the first response and the second response.

In an embodiment of the techniques presented herein, a human machine interface comprises a guard sensor, a human input sensor adjacent the guard sensor, and a controller configured to measure a first response of the guard sensor using a first sensing signal having a first frequency, measure a second response of the guard sensor using a second sensing signal having a second frequency, configure a sensor frequency of the human input sensor based on the first response of the guard sensor and the second response of the guard sensor, measure a first response of the human input sensor using the sensor frequency, and identify a touch event on the human input sensor based on the first response of the human input sensor.

In an embodiment of the techniques presented herein, the controller is configured to determine a presence of an interference source based on the first response of the guard sensor and the second response of the guard sensor, and configure the human input sensor responsive to determining the presence of the interference source.

In an embodiment of the techniques presented herein, the interference source comprises a liquid impinging on the human machine interface, and the controller is configured to disable the human input sensor responsive to the interference source comprising the liquid.

In an embodiment of the techniques presented herein, the human machine interface comprises a shield electrode, wherein the controller is configured to measure the first response of the guard sensor and the second response of the guard sensor with the shield electrode enabled, measure a third response of the guard sensor using the first sensing signal with the shield electrode disabled, measure a fourth response of the guard sensor using the second sensing signal with the shield electrode disabled, and determine the presence of the interference source by differentiating between a touch event and a liquid impingement event on the guard sensor based on the third response of the guard sensor and the fourth response of the guard sensor.

In an embodiment of the techniques presented herein, the interference source comprises a radio frequency interference source at the first frequency, and the controller is configured to select the second frequency as the sensor frequency.

In an embodiment of the techniques presented herein, the controller is configured to change the first sensing signal to have a third frequency different than the first frequency, and measure the first response using the first sensing signal with the third frequency.

In an embodiment of the techniques presented herein, the controller is configured to detect a proximity event based on the first response using the first sensing signal with the third frequency and the second response.

In an embodiment of the techniques presented herein, a human machine interface comprises a guard sensor, a human input sensor adjacent the guard sensor, and a controller configured to detect an interference event on the guard sensor using a frequency hopping technique with a set of sensing frequencies, detect a touch event on the human input sensor using a single frequency technique, and configure a sensor frequency of the human input sensor for the single frequency technique based on the interference event.

In an embodiment of the techniques presented herein, the interference event comprises a liquid impingement event, and the controller is configured to disable the human input sensor responsive to the interference event comprising the liquid impingement event.

In an embodiment of the techniques presented herein, the human machine interface comprises a shield electrode, wherein the controller is configured to detect the interference event with the shield electrode enabled, detect the interference event with the shield electrode disabled, and differentiate between a touch event and a liquid impingement event as the interference event based on detecting the interference event with the shield electrode disabled.

In an embodiment of the techniques presented herein, the interference event comprises a radio frequency interference event at a first frequency in the set of sensing frequencies, and the controller is configured to exclude the first frequency from the set of sensing frequencies responsive to detecting the interference event.

In an embodiment of the techniques presented herein, the interference event comprises a radio frequency interference event at a first frequency in the set of sensing frequencies, and the controller is configured to exclude the first frequency from being selected as the sensor frequency responsive to detecting the interference event.

In an embodiment of the techniques presented herein, the controller is configured to detect a proximity event using the guard sensor.

The term "computer readable media" and/or the like may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

Any aspect or design described herein as an "example" and/or the like is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method comprising:
   measuring a first response of a guard sensor of a human machine interface using a first sensing signal having a first frequency;
   measuring a second response of the guard sensor using a second sensing signal having a second frequency;
   configuring a human input sensor of the human machine interface adjacent the guard sensor after measuring the first response and measuring the second response to select a sensor frequency based on the first response of the guard sensor and the second response of the guard sensor;
   measuring a first response of the human input sensor using the sensor frequency; and
   identifying a touch event on the human input sensor based on the first response of the human input sensor.

2. The method of claim 1, comprising:
   determining a presence of an interference source based on the first response of the guard sensor and the second response of the guard sensor, wherein configuring the human input sensor comprises configuring the human input sensor responsive to determining the presence of the interference source.

3. The method of claim 2, wherein:
   the interference source comprises a liquid impinging on the human machine interface; and
   configuring the human input sensor comprises disabling the human input sensor.

4. The method of claim 2, wherein:
   measuring the first response of the guard sensor and the second response of the guard sensor comprises measuring the first response of the guard sensor and the second response of the guard sensor with a shield electrode of the human machine interface enabled; and
   the method comprises:
      measuring a third response of the guard sensor using the first sensing signal with the shield electrode disabled; and
      measuring a fourth response of the guard sensor using the second sensing signal with the shield electrode disabled; and
   determining the presence of the interference source comprises differentiating between a touch event and a liquid impingement event on the guard sensor based on the third response of the guard sensor and the fourth response of the guard sensor.

5. The method of claim 2, wherein:
   the interference source comprises a radio frequency interference source at the first frequency; and
   configuring the human input sensor comprises selecting the second frequency as the sensor frequency.

6. The method of claim 5, comprising:
   changing the first sensing signal to have a third frequency different than the first frequency; and
   measuring the first response of the guard sensor using the first sensing signal with the third frequency.

7. The method of claim 1, comprising:
   detecting a proximity event based on the first response and the second response.

8. A human machine interface comprising:
   a guard sensor;
   a human input sensor adjacent the guard sensor; and
   a controller configured to:
      measure a first response of the guard sensor using a first sensing signal having a first frequency;
      measure a second response of the guard sensor using a second sensing signal having a second frequency;
      configure a sensor frequency of the human input sensor after measuring the first response and measuring the second response based on the first response of the guard sensor and the second response of the guard sensor;

measure a first response of the human input sensor using the sensor frequency; and identify a touch event on the human input sensor based on the first response of the human input sensor.

9. The human machine interface of claim 8, wherein the controller is configured to:

determine a presence of an interference source based on the first response of the guard sensor and the second response of the guard sensor; and configure the human input sensor responsive to determining the presence of the interference source.

10. The human machine interface of claim 9, wherein:

the interference source comprises a liquid impinging on the human machine interface; and the controller is configured to disable the human input sensor responsive to the interference source comprising the liquid.

11. The human machine interface of claim 9, comprising: a shield electrode, wherein:

the controller is configured to:

measure the first response of the guard sensor and the second response of the guard sensor with the shield electrode enabled;

measure a third response of the guard sensor using the first sensing signal with the shield electrode disabled;

measure a fourth response of the guard sensor using the second sensing signal with the shield electrode disabled; and determine the presence of the interference source by differentiating between a touch event and a liquid impingement event on the guard sensor based on the third response of the guard sensor and the fourth response of the guard sensor.

12. The human machine interface of claim 9, wherein:

the interference source comprises a radio frequency interference source at the first frequency; and the controller is configured to select the second frequency as the sensor frequency.

13. The human machine interface of claim 12, wherein the controller is configured to:

change the first sensing signal to have a third frequency different than the first frequency; and measure the first response using the first sensing signal with the third frequency.

14. The human machine interface of claim 13, wherein the controller is configured to:

detect a proximity event based on the first response using the first sensing signal with the third frequency and the second response.

15. A human machine interface comprising:

a guard sensor;

a human input sensor adjacent the guard sensor; and a controller configured to:

detect an interference event on the guard sensor using a frequency hopping technique with a set of sensing frequencies;

detect a touch event on the human input sensor using a single frequency technique; and configure a sensor frequency of the human input sensor for the single frequency technique based on the interference event after detecting the interference event.

16. The human machine interface of claim 15, wherein:

the interference event comprises a liquid impingement event; and the controller is configured to disable the human input sensor responsive to the interference event comprising the liquid impingement event.

17. The human machine interface of claim 15, comprising:

a shield electrode, wherein:

the controller is configured to:

detect the interference event with the shield electrode enabled;

detect the interference event with the shield electrode disabled; and differentiate between a touch event and a liquid impingement event as the interference event based on detecting the interference event with the shield electrode disabled.

18. The human machine interface of claim 15, wherein:

the interference event comprises a radio frequency interference event at a first frequency in the set of sensing frequencies; and the controller is configured to exclude the first frequency from the set of sensing frequencies responsive to detecting the interference event.

19. The human machine interface of claim 15, wherein:

the interference event comprises a radio frequency interference event at a first frequency in the set of sensing frequencies; and the controller is configured to exclude the first frequency from being selected as the sensor frequency responsive to detecting the interference event.

20. The human machine interface of claim 15, wherein the controller is configured to:

detect a proximity event using the guard sensor.

* * * * *